United States Patent
Barrett, Jr.

[15] 3,678,730
[45] July 25, 1972

[54] METER PROVING SYSTEM

[72] Inventor: Maurice L. Barrett, Jr., 5514 Airline Drive, Houston, Tex. 77022

[22] Filed: July 9, 1970

[21] Appl. No.: 53,543

[52] U.S. Cl. ............................................73/3, 15/104.06 A
[51] Int. Cl. ......................................................G01f 25/00
[58] Field of Search ..................................73/3; 15/104.06 A

[56] References Cited

UNITED STATES PATENTS

| | | | |
|---|---|---|---|
| 3,541,837 | 11/1970 | Davis et al. | 73/3 |
| 3,322,140 | 5/1967 | Scott | 15/104.6 A |
| 3,224,247 | 12/1965 | Barrett, Jr. | 73/3 |
| 3,232,090 | 2/1966 | Walker | 73/3 |

Primary Examiner—Louis R. Prince
Assistant Examiner—William A. Henry, II
Attorney—J. Vincent Martin, Joe E. Edwards and Jack R. Springgate

[57] ABSTRACT

A flow measuring system including a known volume loop, a ball transfer interchange connecting between the inlet and outlet of the loop, said interchange including a plurality of ball stations and means for establishing pressure differentials on balls in said interchange to positively move balls through said interchange. A method of transferring balls from the outlet of a power loop to the inlet of the power loop by establishing pressure differentials between opposite sides of the ball to be moved while supporting another ball in the interchange to maintain such pressure differential.

23 Claims, 10 Drawing Figures

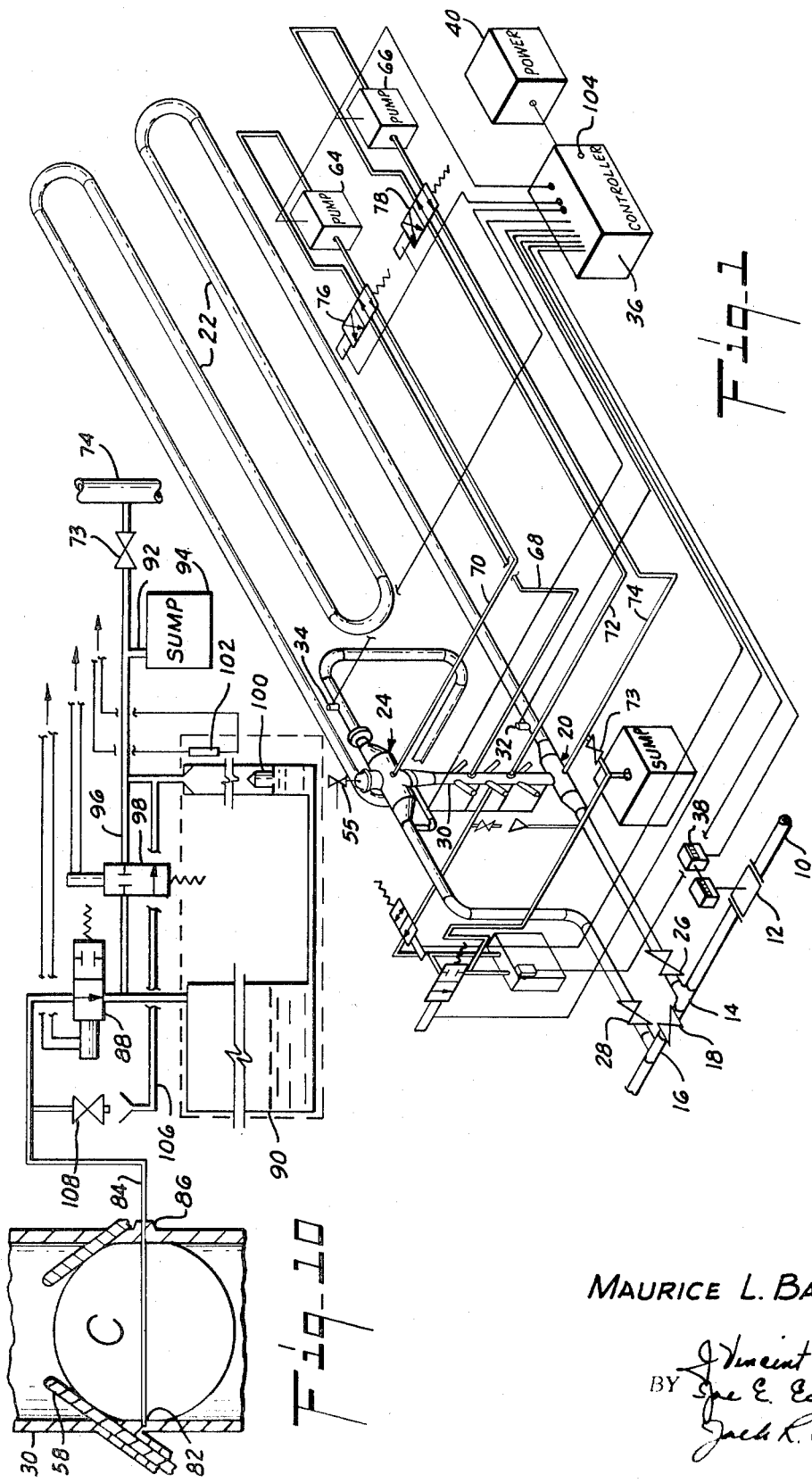

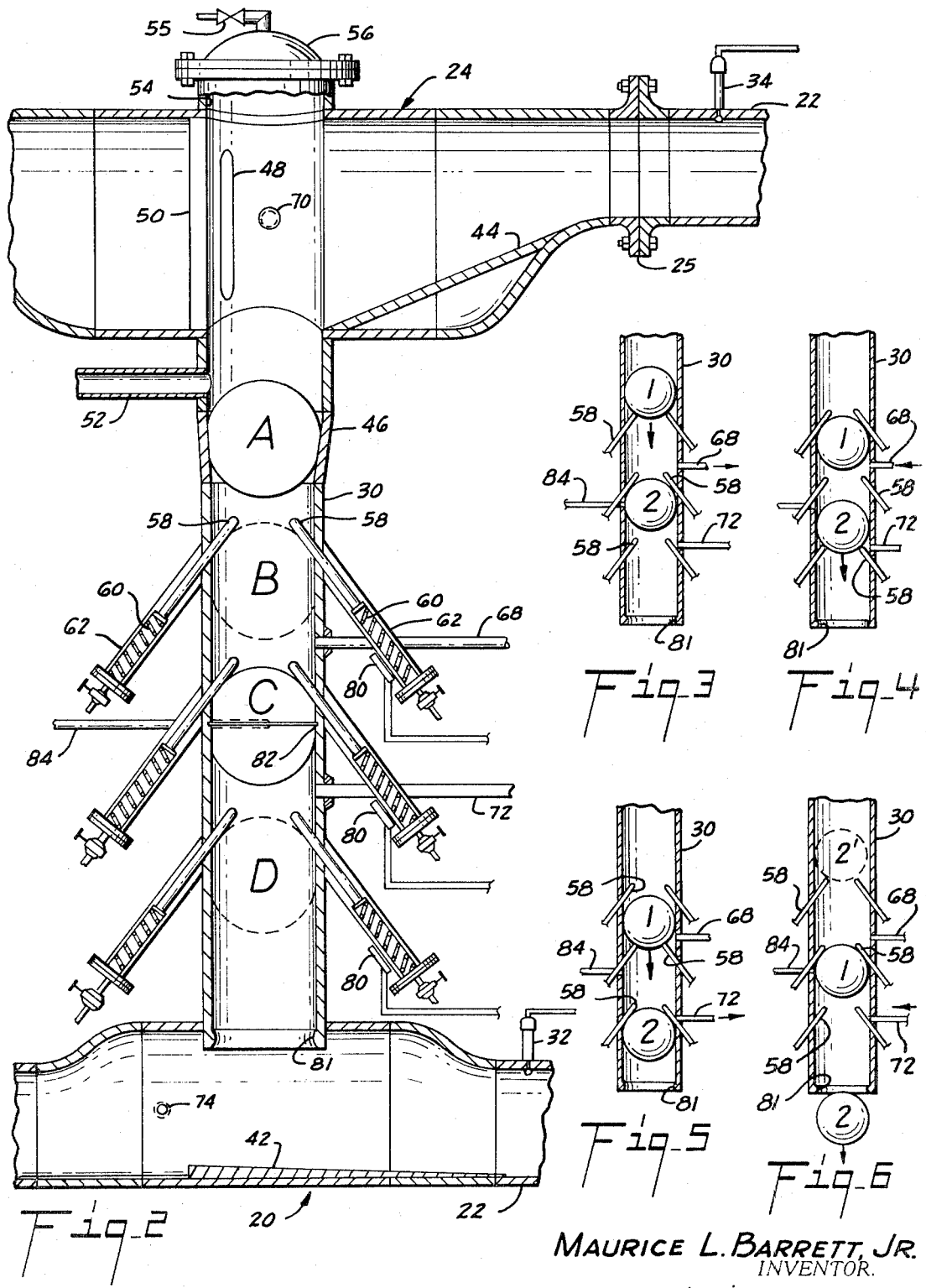

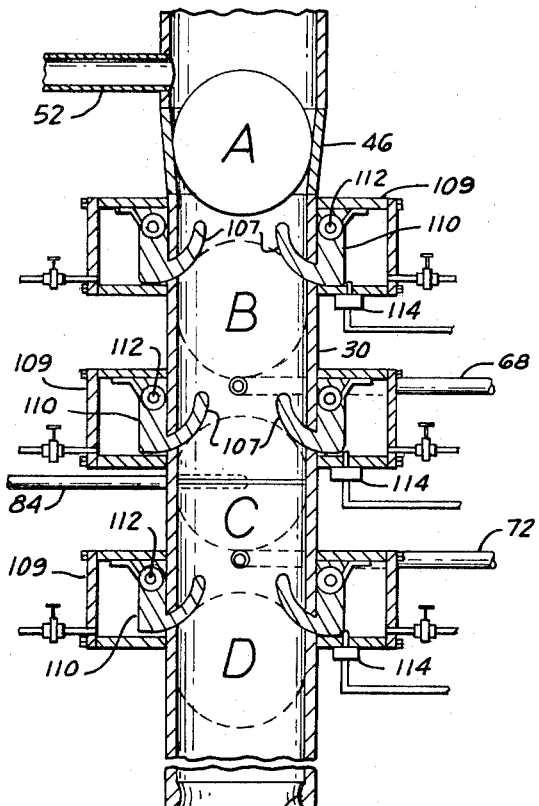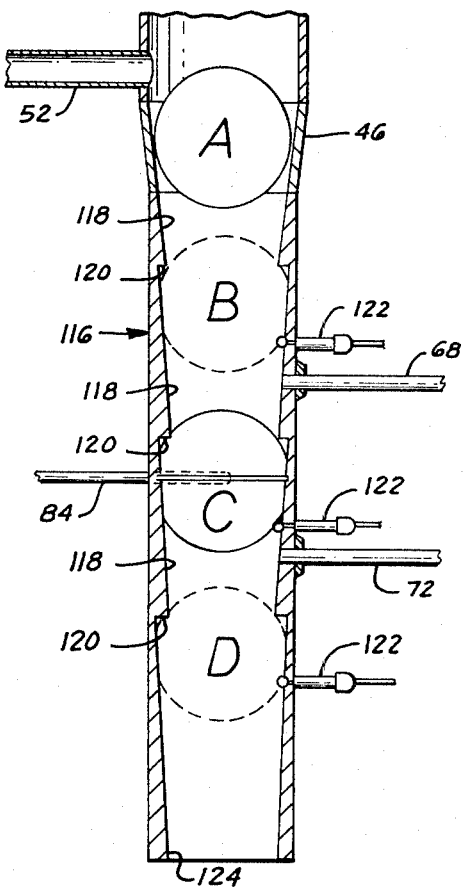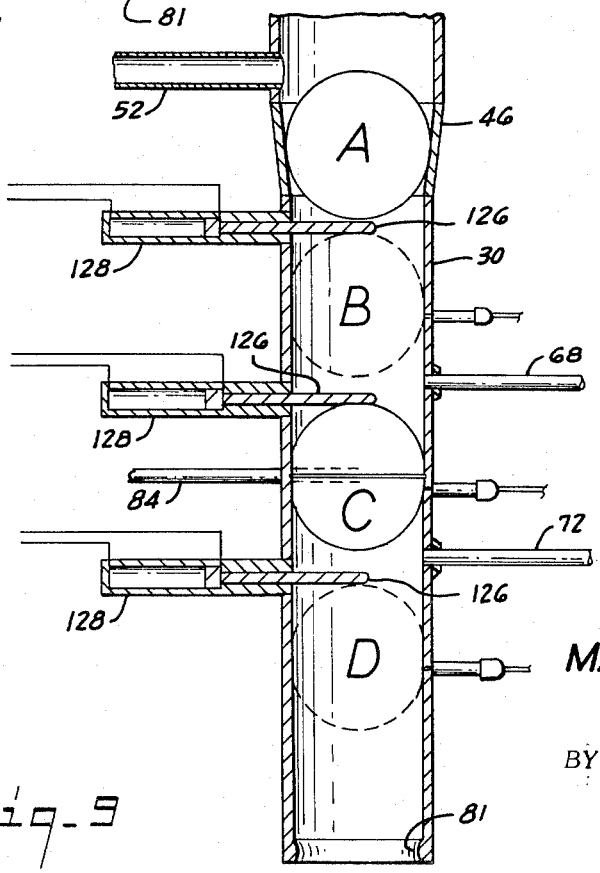

METER PROVING SYSTEM

SUMMARY

Liquid meter prover loops have commonly been provided with a ball transfer interchange to allow return of the balls from the loop outlet to the loop inlet. Such interchanges have been mounted with the outlet above the loop inlet to allow the ball to move through the interchange responsive to gravity. With this gravity movement of the balls through the interchange line, a valving means is provided to prevent fluid from flowing through the interchange rather than around the loop.

The present invention relates to an improved flow meter prover system and the improved method of transferring displacers such as balls from the outlet to the inlet of the prover loop.

An object of the present invention is to provide an improved method of and apparatus for transferring balls from the outlet to the inlet of a flow meter prover loop responsive to pressure differentials.

Another object is to provide an improved ball transfer system for moving balls from the outlet of a flow meter prover loop and launching the balls into the inlet of such loop which system prevents fluid flow through the interchange without using expensive and complex valves and sealing systems.

Another object is to provide an improved ball transfer system for a meter prover loop which utilizes only two balls, one of which is positioned in the interchange to provide a seal therein.

A further object is to provide an improved method of and apparatus for ball transfer in which the balls are positively moved through a ball transfer interchange.

Another object is to provide an improved flow meter prover loop which is inexpensive to build and maintain.

A still further object is to provide an improved flow meter prover loop interchange in which any failure of sealing in the interchange is immediately detected and suitable indication or alarm is provided responsive to the detection of leakage.

BRIEF DESCRIPTION OF THE DRAWINGS

These and other objects and advantages of the present invention are hereinafter set forth and explained with relation to the embodiments of the present invention shown in the drawings wherein:

FIG. 1 is a perspective view of a complete flow meter prover loop system including controls therefor which embodies the improvement of the present invention.

FIG. 2 is a sectional view of the ball transfer interchange showing the preferred form of ball support structure in the interchange.

FIGS. 3, 4, 5, and 6 are schematic views of the ball supports and moving structure shown in FIG. 2 to illustrate the steps of moving the balls through the interchange from the loop outlet to the loop inlet.

FIG. 7 is another sectional view of the ball transfer interchange illustrating a modified form of ball support.

FIG. 8 is another sectional view of the ball transfer interchange illustrating another modified form of ball support.

FIG. 9 is another sectional view of the ball transfer interchange and illustrates still another modified form of ball support.

FIG. 10 is a schematic flow diagram of the leakage detection and alarm system for the ball transfer interchange.

DESCRIPTION OF THE PREFERRED EMBODIMENTS

The complete flow meter prover loop system illustrated in FIG. 1 includes the main flow line 10 with the flow meter 12 installed therein to measure flow therethrough. The flow line 10 includes the tees 14 and 16 and the shut-off valve 18. The tee 14 is connected to the inlet 20 of the calibrated prover section or loop 22 and the outlet 24 of the flow loop 22 connects to the tee 16. The flange pair 25 provides a separable connection between loop 22 and outlet 24. Valves 26 and 28 are provided to shut off flow through the flow loop 22 when valve 18 is open. The system includes the ball transfer interchange or conduit 30 which extends between inlet 20 and outlet 24 as shown.

The flow measurement readings of the flow meter 12 are checked by comparison of such readings against the known volume in the flow loop 22 between the two ball detecting devices 32 and 34. As a ball launched into the inlet 20 passes the device 32, it signals the controller 36 to start the counter 38 connected to the flow meter 12 and as the ball passes the device 34, such device signals the controller 36 to stop the counter 38 so that the counter 38 only records the flow measurement of the flow meter 12 during the time it takes the ball to displace the precalibrated volume of the loop 22 between the devices 32 and 34. The comparison of the indicated flow measurement with the known volume of the loop is used to establish the relationship between the volume indicated by the meter register or counter and the absolute volume displaced from the prover. The power source 40 provides power for the controller 36 and through the controller to the detectors 32 and 34 and other parts of the system hereinafter described.

Generally the balls are selected to be an elastomer having a free diameter slightly larger than the inner diameter of the loop 22. In this way the balls seal against the interior walls of loop 22 as they pass therethrough to prevent leakage of fluid around them and thereby assure that the precalibrated volume known to be displaced from the loop 22 is the true volume of fluid which flows through the meter during the time the ball is in the loop. As can be seen from FIGS. 1 and 2, the inlet 20 and outlet 24 have larger internal diameters than the loop 22 so that fluid may flow around the ball in the inlet and outlet.

The interchange 30 extends into the inlet 20 at generally right angles to discharge or launch a ball onto the tapered ramp 42 of the inlet which coacts with fluid flow to assure that the ball moves through the inlet 20 toward and into the loop 22. The enlarged portion of the outlet 24 includes the sloping grate 44 which allows the ball to roll downwardly thereon into the tapered section 46, of the interchange 30. The grates 48 and 50 are positioned to assure that the ball does not continue through the outlet 24 and to cause some of the flow to be diverted down into the interchange 30, which flow returns to the line 10 through the by-pass line 52. Balls are loaded into the interchange 30 through the closure 54 by removing the cover 56 at a time when the fluid is not flowing through the flow loop 22. As can clearly be seen from FIG. 2, the major portion of the interchange 30 has a diameter smaller than the diameter of the balls. The internal diameter of the interchange 30 is substantially the same as the internal diameter of the prover loop 22.

The interchange 30 is provided with means for supporting and locating the balls therein in different positions as hereinafter explained and means for establishing a pressure differential across a ball in any of the ball positions established by the supporting means. The supporting means shown in FIG. 2 each includes the plungers 58 which extend into the interior of interchange 30 and are spring-loaded toward their innermost position by the springs 60 contained within the housing 62 secured to the exterior of the interchange 30. The four ball positions designated position "A" within the tapered section 46, the position "B" immediately below the upper of the plungers 58, the position "C" immediately below the intermediate plungers 58 and the position "D" immediately below the lower of the plungers 58 are established by section 46 and the support means respectively. While two of the plungers 58 are shown in each of the supporting positions, one or more plungers 58 may be used at each position provided the plungers allow the movement of the balls in the direction toward the inlet 20 and prevent the opposite movement of the balls therein.

The means for establishing a pressure differential includes the pumps 64 and 66, the lines 68, 70, 72 and 74 and the reversing valves 76 and 78. The pump 64 can withdraw liquid from interchange 30 through line 68 and return it to outlet 24 through line 70. A reversal of valve 76 causes liquid to be withdrawn from outlet 24 through line 70 and returned to interchange 30 through line 68. Similarly pump 66 can withdraw liquid from interchange 30 through line 72 and return the liquid to the inlet 20 through line 74. By reversing valve 78 the pump then withdraws liquid from inlet 20 through line 74 and returns the liquid to interchange 30 through line 72. If desired, valves 76 and 78 can be omitted by providing for a reversal of flow through pumps 64 and 66 and controls therefor. It should be noted that while the drawings show two pumps 64 and 66 for the operation of the ball transfer through the interchange, one pump may be used by providing connections to both its suction and discharge connections alternately with the connections into the interchange 30 to establish the desired pressure differentials.

The movement of balls through interchange 30 is detected by the devices 80 mounted on the exterior of the housings 62. These devices may be magnetic or any other suitable type of detector which senses the retraction and return of the plungers 58 in the housings 62. Such devices are connected to controller 36 to provide an indication or signal that a ball has completed its passage through one of the supporting means and that the supporting means has returned to its normal ball supporting position. These detectors 80, in combination with ball detectors 32 and 34, provide the signals to effect complete automatic control and sequencing of each meter proving run following an initiating command signal.

It is preferred that the plungers 58 be loose fitting within the housings 62 and may even be provided with splines or holes to equalize the pressure on both ends of the plungers. In this type of construction the springs 60 need only overcome the effect of gravity and friction on the plunger to bias the plungers 58 toward their innermost support position. Suitable connections are provided to blow-down the dirt and abrasive materials which may collect within the housings 62. Alternately, means may be provided to seal around the plungers 58 so that the housings 62 do not fill with liquid to slow or limit the movement of the plungers 58 therein. Also valve controlled lines are provided to drain the outer end of the housings 62 of any liquid which collects therein. With such seals, the force of the springs 60 should be sufficiently strong so that the plungers 58 do not retract solely from the pressure differential between the interior of interchange 30 and the interior of the housings 62.

When the system of the present invention is first put into service valve 18 is opened, valves 26 and 28 are closed and fluid is drained from the prover until no liquid is present in the flange pair 25. The flange pair 25 are parted, a skillet blind inserted therebetween, and the flange pair 25 retightened. Closure 56 is then opened and a ball or sphere is dropped through the opening 54 into the tapered section 46 of the interchange 30. The closure 56 is closed, the prover is repressurized by opening valve 28 and venting air through air vent 55. When all the air has been vented, valve 55 is closed and valve 73 is opened to the sump until the ball has been moved to position "C" as indicated by the detector switch 80 at that position. When this indication is noted, valve 73 is closed and the prover is again depressurized. A second ball is dropped in through the opening 54 and then the skillet blind is removed from between the flange pair 25. After closing closure 56 the prover system is ready for a prover run. In this position the movement of the balls may be accomplished by the pressure differential establishing means. When it is desired to launch a ball into the inlet 20 so that a run may be made checking the reading of the flow meter 12, the pumps 64 and 66 are primed and the lines 68, 70, 72 and 74 are filled with liquid. The action of the pressure differentials on the balls and their movement responsive thereto is clearly shown in the diagrammatic illustrations of FIGS. 3, 4, 5 and 6.

In FIG. 3 the ball number 1 is forced downward from the "A" position by the differential pressure resulting from the evacuation of the portion of the interchange 30 between balls 1 and 2 by the pumping of pump 64 from line 68 and into line 70, ball 2 being in the "C" position and restrained against movement toward the "B" position. As soon as the ball 1 has moved past the upper of the support plungers 58 into the "B" position, the flow from pump 64 is reversed by actuation of valve 76 to provide liquid to the interchange 30 through line 68 from line 70. This creates a pressure on ball 2 forcing it downward as shown in FIG. 4. As soon as ball 2 has moved past the lower support plungers, the pump 64 is stopped and then pump 66 is started. Pump 66 pumps liquid from interchange 30 through line 72 and this liquid is returned to inlet 20 through line 74. As shown in FIG. 5, ball 2 is held by plungers 58 in the "D" position and ball 1 is moved down past the intermediate support plungers into the "C" position responsive to the pressure differential resulting from the evacuation of interchange 30. With ball 1 in the "C" position the valve 78 is reversed and pump 66 pumps liquid from inlet 20 through line 74 into interchange 30 through line 72. Since ball 1 is supported by the intermediate plungers 58, ball 2 is forced by the pressure down through the restriction 81 at the lower end of interchange 30 and is discharged or launched into the inlet 20 as shown in FIG. 6. The launched ball is propelled through the loop 22 and returns to interchange 30 in the "A" position as indicated in dashed lines as ball 2'. The restriction 81 functions to provide a deterrent to the movement of the balls at the bottom of the interchange 30.

From the foregoing it can be seen that the coaction of the support means, the pressure differential establishing means and the balls, that the balls are positively moved through the interchange 30 responsive to the pressure differentials. Also, by virtue of the inner diameter of interchange 30 being smaller than the normal free diameter of the balls, the ball provides an effective seal to allow such pressure differentials to be developed and to prevent the liquid flow from by-passing the loop 22 by flowing through the interchange 30. When a test run is being made, one of the balls is in the position "C" and provides a static seal against the interior of the interchange 30 to assure that no liquid by-passes the flow loop 22. The other ball will be moving through the flow loop 22 and provides a dynamic seal to prevent fluid from flowing around such ball.

To assure that there is no leakage of liquid past the ball which is in position "C", a leakage detection and indication system is provided as shown in FIG. 10. The interchange 30 has a narrow, shallow groove extending around its interior surface appropriately located below the intermediate support means and in a central location with respect to position "C". In this position a ball will normally seal against the interior of the interchange 30 on both sides of groove 82 to prevent any leakage of liquid into the groove 82. The line 84 is connected into the boss 86 which communicates with groove 82 so that leakage into groove 82 is delivered to line 84. Line 84 also connects to valve 88 which in one position places the line 84 in communication with the large or reservoir side of the hydraulic manometer 90 and in its other position closes such communication. The top of the small leg of the manometer 90 is in communication through line 92 to the sump 94. The equalizing line 96 between the two legs of manometer 90 is normally closed by valve 98 but is provided to reset the manometer 90 to a balanced position before a check for leakage is made. Valves 88 and 98 are provided with suitable connections to controller 36 for proper control and operation of the leakage detection system. Whenever a ball is in the position "C" and particularly during a run of the prover, the interchange is checked for leakage. Such leakage checks not only detect leakage through the interchange 30 but may be an indication of the ball being too small, worn, improperly inflated or improperly positioned in the centered position across the groove 82.

When leakage is detected it is desired that some indication or alarm be given so that steps can be taken to eliminate such leakage and to indicate that leakage has taken place during the testing of a meter. The leakage indicating means is provided by the float 100 which floats on the surface of the liquid within the small leg of the manometer 90 and by the detector 102 positioned outside the upper part of such small leg so that as the float rises to its upper position it actuates detector 102. Detector 102 is connected to controller 36. The alarm may be given in any desired manner. For example, controller 36 is shown to have the alarm light 104 on its face, which when lit by detector 102, indicates that there has been some leakage of liquid past the ball seated in position "C". Line 84 is also provided with a drain 106 controlled by valve 108 and connected to the sump 94 to provide a manual visual leakage test. Automatic detector 102 may be any suitable type such as a magnetically actuated electrical reed switch which, when float 100 rises to the upper part of its leg, moves from one position to another position, for example, completes the circuit to light the alarm light 104. Also, if desired, the upper end of the small leg may be tapered to form a valve seat which coacts with the upper part of float 100 so that when float 100 rises to the top it closes the connection to the sump 94 and thereby shuts off further flow of liquid into the system from groove 82.

The modified forms of ball transfer interchange systems are illustrated in FIGS. 7, 8 and 9. The same numbers for parts are used as those numbers previously used herein for the same parts but new and changed parts are given separate number designations. In FIG. 7 the interchange 30 is provided with the tapered section 46, the lower restriction 81, the groove 82 with line 84 extending therefrom and the connections of lines 68 and 72 into interchange 30 for establishing pressure differentials on balls therein for moving such balls through the interchange 30. Additionally, suitable support means is provided to define the positions "B", "C", and "D" for balls within interchange 30. The support means shown in FIG. 7 includes the arcuate finger 107 pivotally mounted within the housing 109 on the exterior of interchange 30 so that it can move into support position within interchange 30 and can retract completely from the interior of interchange 30 into the housing 109 to allow a ball to move through the interchange in the direction toward the inlet 20. The finger 107 is integral with the outer portion of arm 110 which is mounted to housing 109 by the pin 112, to provide the pivotal mounting of finger 107. One of the housings 109 at each ball support position is provided with the detector 114 which connects to the controller 36 to give an indication of the movement of the balls through the interchange 30. The fingers 107 of such support means extend through holes in the walls of interchange 30. Such holes are preferably larger than the cross-section of finger 107 so that pressure equalization can take place during movement of the fingers 107 to thereby minimize the pressure effect on the movement of fingers 107. Each of the housings 109 is provided with a suitable drain as shown. The purpose of the drain is to allow the blowdown of the liquids and dirt within the housings 109 to assure freedom of movement of the fingers 107 therein.

The movement of the balls through the form of interchange 30 shown in FIG. 7 is identical to that previously described with the pressure differentials being created on the balls and the support means holding the balls against movement toward the outlet 24 while allowing free movement toward the inlet 20.

The form of interchange shown in FIG. 8 is similar to those previously described in operation but differs in that the internal configuration of the interchange 116 is modified to define the ball supporting means with a plurality of tapered portions 118. The tapered portions 118 may have substantially the same taper as section 46 and each portion terminates in the annular shoulder 120 facing the inlet 20. The tapered portions 118 and the shoulders 120 which are defined thereby function as the support means to allow movement of the balls through the interchange 116 toward the inlet 20 while shoulders 120 are sufficiently wide to prevent movement of the balls toward the outlet 24 responsive to pressure differentials. Thus, the support means coacts with the pressure differential establishing means to cause the balls to move through the interchange 116 in sequence through the various positions as shown in FIG. 8. The detectors 122 extend through the walls of the tapered portions 118 of interchange 116 to provide an indication to the controller 36 that a ball has moved past their particular location. The interchange 116 is provided with a lower tapered section 118 which defines the restriction 124 through which a ball has to pass immediately before it is launched into the inlet 20. This restriction 124 is such that as the ball from position D is moved therethrough, a sufficient transient increase in pressure is created between the balls of the C and D positions to drive the ball in the C position firmly upward against its support means and assuring its centered location over the annular groove 82.

In the modified form of invention shown in FIG. 8, the shoulders 120 function to prevent the reverse movement of the ball just as the plungers or fingers prevent such reverse movement in the other forms. Such shoulders are believed to be effective in preventing such reverse movement without preventing the desired movement in the opposite direction since balls will move through the gradually tapering portions responsive to pressure differentials but reverse movement over one of the shoulders is too much of an immediate contraction for the ball that it resists the normal pressure differentials used for ball movement. Thus the sizing of the tapered portions 118 should be such that the balls will move in the desired direction responsive to the pressure differentials to be used but such shoulders 120 should be a sufficiently large change in diameter to prevent reverse movement of balls responsive to the same pressure differentials.

The other modified form of interchange and ball transfer means is shown in FIG. 9. The tapered section 46 connects from the outlet 24 to one end of interchange 30 and the lower end of interchange 30 is connected to the inlet 20. The interchange 30 is provided with the usual pressure differential establishing means and a modified ball support means. Each of the ball support means includes the plunger 126 which extends through the wall of the interchange 30 from the cylinder 128. Lines connect to the cylinder 128 to positively retract or extend the plunger 126. These positively actuated plungers 126 provide the several different positions for a ball moving through the interchange as shown in FIG. 9. The operation of such interchange 30 is substantially as previously described in connection with the preferred form except that the plungers 126 are positively moved by the application of external fluid pressure to the cylinders 128. The ball support means of this form of the interchange thus prevents movement of the ball in both directions in interchange 30 except when a movement is specifically intended. To allow movement of balls toward the inlet 20, the plungers 126 are retracted.

While the interchanges shown in all forms have been described as being mounted in the vertical position with the outlet 24 being above the inlet 20 as shown in FIG. 1, the operation of all forms of the ball transfer system through the interchange moves the balls independent of gravity responsive to the diferential pressures which are positively created. By proper design of the restriction provided by grates 48 and 50 and by proper sizing of by-pass line 52 a ball in outlet 24 can be deposited in tapered section 46 responsive to flow rather than solely by gravity. Thus the interchange may be positioned at any angle.

From the foregoing it can be seen that the present invention provides an improved method of and apparatus for transferring balls from the outlet of a prover loop to its inlet which does not require expensive and complicated sealing devices and will move the balls independent of gravity. Also, the present invention provides an improved meter proving system in which balls are positively launched and recovered from a prover loop solely responsive to pressure differentials created in a ball transfer interchange.

The foregoing disclosure and description of the invention are illustrative and explanatory thereof, and various changes in the size, shape and materials, as well as in the details of the illustrated construction, may be made within the scope of the appended claims without departing from the spirit of the invention.

What is claimed is:

1. The method of transferring balls through the interchange of a meter prover loop wherein the interchange is sized to cause the balls to seal therein, including the steps of
   establishing fluid pressure differentials sequentially between the balls within said interchange whereby said balls may be moved through said interchange responsive to said pressure differentials, and
   positively supporting the balls against reverse movement through said interchange.

2. The method according to claim 1, wherein
   at least one ball is positioned within said interchange at all times to prevent flow therethrough.

3. The method according to claim 1, including the steps of
   detecting leakage of fluid past a ball positioned within said interchange, and
   indicating such leakage.

4. The method according to claim 1, wherein
   the pressure differentials are established on two balls within said interchange at the same time to move one of said balls, the other of said balls being supported against movement by said supporting step.

5. The method according to claim 1, wherein
   said supporting step defines three support positions within said interchange, and
   said pressure differential establishing step includes alternately withdrawing fluid from said interchange at a position between the two balls positioned therein and then introducing fluid into said duct at a position between the two balls whereby the balls are moved through said interchange responsive to said differentials.

6. The method of transferring balls through the interchange of a meter prover loop including the steps of
   introducing two balls into said interchange at spaced apart positions.
   evacuating fluid from said interchange between said two balls with the ball closest to the inlet of said prover loop being supported against movement responsive to said evacuation to move the other ball toward said inlet, and
   introducing fluid into said interchange between said two balls with the ball closest to the outlet of said prover loop being supported against movement responsive to said introduction to move the ball closest to said inlet,
   said fluid evacuating and introducing steps being continued to move said balls through said interchange responsive thereto and to launch balls individually into said loop and to recover balls from said loop.

7. The method according to claim 6, wherein
   one ball remains within said interchange during the passage of the other ball through said loop to seal said interchange against flow of fluid therethrough.

8. In a flow meter prover loop having an inlet, a calibrated prover section, an outlet, the improvement including
   an interchange connecting between the outlet and the inlet of said prover section,
   means in said outlet for delivering a ball from said run to said interchange,
   a portion of said interchange having an inner diameter slightly smaller than the diameter of balls used in said section whereby a ball within said interchange seals against its inner walls said portion being at least three ball diameters in length,
   ball supporting means in said interchange adapted to allow movement of balls in said interchange in a direction toward said inlet and prevent movement of said balls in an opposite direction, and
   means for developing sequential pressure differentials between balls in said interchange to move the balls through the interchange responsive to such pressure differentials.

9. The invention according to claim 8, wherein
   at least one ball is positioned within said interchange at all times to assure that all flow is through said meter run.

10. The invention according to claim 8, including
    means connected to said interchange for indicating leakage of fluid past a ball within said interchange.

11. The invention according to claim 8 wherein
    the inner diameter of said major portion of said interchange is substantially the same as the inner diameter of said meter run and the inner diameters of said inlet and said outlet are substantially larger than the inner diameter of said meter run so that said balls easily pass into and out of the flow and to said interchange.

12. A flow measuring system, comprising
    a meter prover loop having an inlet, an outlet and a calibrated prover section,
    an interchange communicating between said inlet and said outlet,
    a first detecting device positioned in the inlet portion of said loop downstream of the connection of said interchange to said loop inlet,
    a second detecting device positioned in the outlet portion of said loop upstream of the connection of said interchange to said loop outlet,
    said detecting devices being so positioned in said loop to detect the passage of a displacing device therethrough to gate a counter,
    timing means connected to said detecting devices for timing the interval during which the displacer is between said detecting devices in said loop,
    a displacing device trap in said outlet to deliver displacing devices from said outlet to said interchange,
    a first movable displacing device supporting means in said interchange for supporting a displacing device in the end of said interchange nearest said outlet of said loop,
    said interchange, said loop and said displacing device being sized so that said displacing devices seal against the interior of said interchange and said loop,
    a second movable displacing device supporting means in said interchange,
    a third movable displacing device supporting means in said interchange,
    pressure and exhaust line connections into said interchange at a plurality of positions for positively moving displacing devices through said interchange responsive to pressure differentials established across each displacing device to sequentially move said displacing devices through said interchange.

13. A ball transfer interchange system for a flow meter prover loop comprising
    a conduit extending between the outlet of said loop and the inlet of said loop,
    means for supporting balls within said conduit at a plurality of positions, and
    means for establishing sequential pressure differentials between balls within said conduit,
    said supporting means adapted to support said balls against movement toward said loop outlet and to be moved to allow movement of balls toward said loop inlet whereby balls may be recovered from said loop outlet, transferred through said conduit and launched individually into said loop inlet responsive to said pressure differentials.

14. A system according to claim 13, wherein said supporting means at each ball position includes
    at least one plunger movably positioned to extend into and retract from the interior of said conduit.

15. A system according to claim 14, wherein
    said plunger is inclined with respect to said conduit in a direction toward the outlet of said loop and the center of said conduit, and
    means resiliently biasing said plunger toward its extended position within said conduit,
    said biasing means allowing retraction of said plunger responsive to the movement of a ball thereby toward said loop inlet.

16. A system according to claim 14, including
    a cylinder on the exterior of said conduit into which said plunger extends, and
    means supplying fluid under pressure to said cylinder to actuate movement of said plunger.

17. A system according to claim 13, wherein said supporting means includes at each ball position
at least one arcuate finger,
means pivotally mounting said finger for movement into ball supporting position within said conduit and for withdrawal from said conduit to allow a ball to pass thereby.

18. A system according to claim 17, wherein said pivotal mounting means includes
an arm connected to said finger,
a housing on the exterior of said conduit,
a pin for pivotally mounting said arm to said housing to allow pivotal movement of said finger for retraction and extension of said finger from and into ball supporting position within said conduit,
said finger being movable out of said conduit responsive to movement of a ball past said ball supporting position in a direction toward said loop inlet.

19. A system according to claim 13, wherein said supporting means includes
a plurality of inwardly converging tapered portions of said conduit, each terminating in a shoulder facing said loop inlet,
said shoulder being of sufficient width to prevent reverse movement of balls responsive to the pressure differentials established within said conduit.

20. The method of moving balls through a ball transfer interchange having four ball positions defined therein commencing with a ball positioned in each of the first and third positions including the steps of
pumping fluid from the interchange between said balls to move the ball in the first position to the second position while supporting the ball in the third position against movement toward the second position,
pumping fluid into said interchange between said balls to move the ball in the third position into the fourth position while supporting the ball in the second position against movement toward the first position,
pumping fluid from the interchange between said balls to move the ball in the second position to the third position while supporting the ball in the fourth position against movement toward the third position, and
pumping fluid into said interchange between said balls to move the ball in the fourth position out of said interchange for launching into a flow loop while supporting the ball in the third position against movement toward the second position.

21. A system for detecting fluid flow through a pipe past a ball seated therein comprising
an annular groove defined around the interior of the pipe,
means for supporting a ball within said pipe in a position to engage around the interior of said pipe on both sides of said groove,
means communicating with said groove to the exterior of said pipe,
valve means in said communicating means, and
means for indicating flow of fluid from said groove through said communicating means to thereby indicate fluid leakage into said groove.

22. A system according to claim 21 wherein said indicating means includes
means for exposing the fluid flowing through said communicating means to provide a visual indication of leakage past the ball in said pipe.

23. A system according to claim 21 wherein said indicating means includes
a U-tube,
one leg of said U-tube being connected to said communicating means, and
means associated with the other leg of said U-tube indicating a rise in liquid level responsive to leakage into said groove.

* * * * *